(12) United States Patent
Harres

(10) Patent No.: US 9,162,828 B2
(45) Date of Patent: Oct. 20, 2015

(54) MAIL SORTER WITH OUTPUT CONTAINER EXCHANGE

(71) Applicant: Luiz Carlos Harres, Allen, TX (US)

(72) Inventor: Luiz Carlos Harres, Allen, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 121 days.

(21) Appl. No.: 13/735,104

(22) Filed: Jan. 7, 2013

(65) Prior Publication Data

US 2013/0186731 A1 Jul. 25, 2013

Related U.S. Application Data

(60) Provisional application No. 61/589,892, filed on Jan. 24, 2012.

(51) Int. Cl.
*B07C 5/00* (2006.01)
*B65G 47/52* (2006.01)
*B07C 3/00* (2006.01)

(52) U.S. Cl.
CPC .. *B65G 47/52* (2013.01); *B07C 3/00* (2013.01)

(58) Field of Classification Search
CPC ...... B07C 3/00; B07C 3/008; B07C 2301/00; B07C 2301/0041; B07C 5/00; B07C 9/00
USPC ................... 209/583, 584, 900; 700/223–227
See application file for complete search history.

(56) References Cited

U.S. PATENT DOCUMENTS

| 6,126,017 A * | 10/2000 | Hours | 209/698 |
| 6,561,339 B1 * | 5/2003 | Olson et al. | 198/349 |
| 7,170,024 B2 * | 1/2007 | Burns et al. | 209/584 |
| 2007/0084764 A1 * | 4/2007 | Benninger | 209/584 |

* cited by examiner

*Primary Examiner* — Thomas Morrison

(57) ABSTRACT

Mail processing systems, methods, and computer-readable media. A method includes assigning first and second delivery points to a single output at the same time. The method includes sorting a first mail piece sorted to the first delivery point and a second mail piece sorted to the second delivery point. The method includes placing both first and second output containers, associated with the first and second delivery points, into a position proximate to the output. The method includes moving the first output container into a position to receive the mail pieces sorted to the first delivery point from the output and to moving the second output container into a position to receive the mail pieces sorted to the second delivery point from the output.

20 Claims, 3 Drawing Sheets

MAIL SORTER WITH OUTPUT CONTAINER EXCHANGE

CROSS-REFERENCE TO RELATED APPLICATION

This application claims the benefit of the filing date of U.S. Provisional Patent Application 61/589,892, filed Jan. 24, 2012, which is hereby incorporated by reference.

TECHNICAL FIELD

The present disclosure is directed, in general, to mail processing systems and methods.

BACKGROUND OF THE DISCLOSURE

Improved systems are desirable.

SUMMARY OF THE DISCLOSURE

Various disclosed embodiments include mail processing system, methods, and computer-readable media. A method includes assigning a first delivery point and a second delivery point to a single output at the same time. The method includes sorting a plurality of mail pieces, including at least a first mail piece sorted to the first delivery point and at least a second mail piece sorted to the second delivery point. The method includes placing both a first output container, associated with the first delivery point, and a second output container, associated with the second delivery point, into a position proximate to the output. The method includes, while sorting, when the first mail piece reaches the output, moving the first output container into a position to receive the first mail piece from the output, and when the second mail piece reaches the output, moving the second output container into a position to receive the second mail piece from the output. The method includes continuing to move the first output container into a position to receive the mail pieces sorted to the first delivery point from the output and to move the second output container into a position to receive the mail pieces sorted to the second delivery point from the output.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
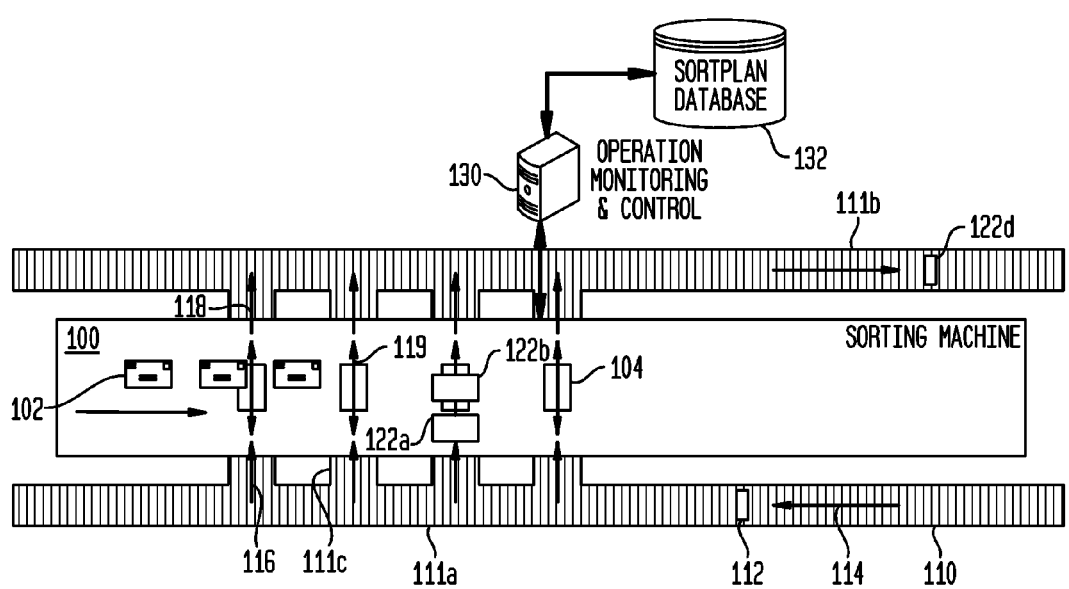
FIG. 1 shows a simplified illustration of a mail processing system in accordance with disclosed embodiments.
Figure 2:
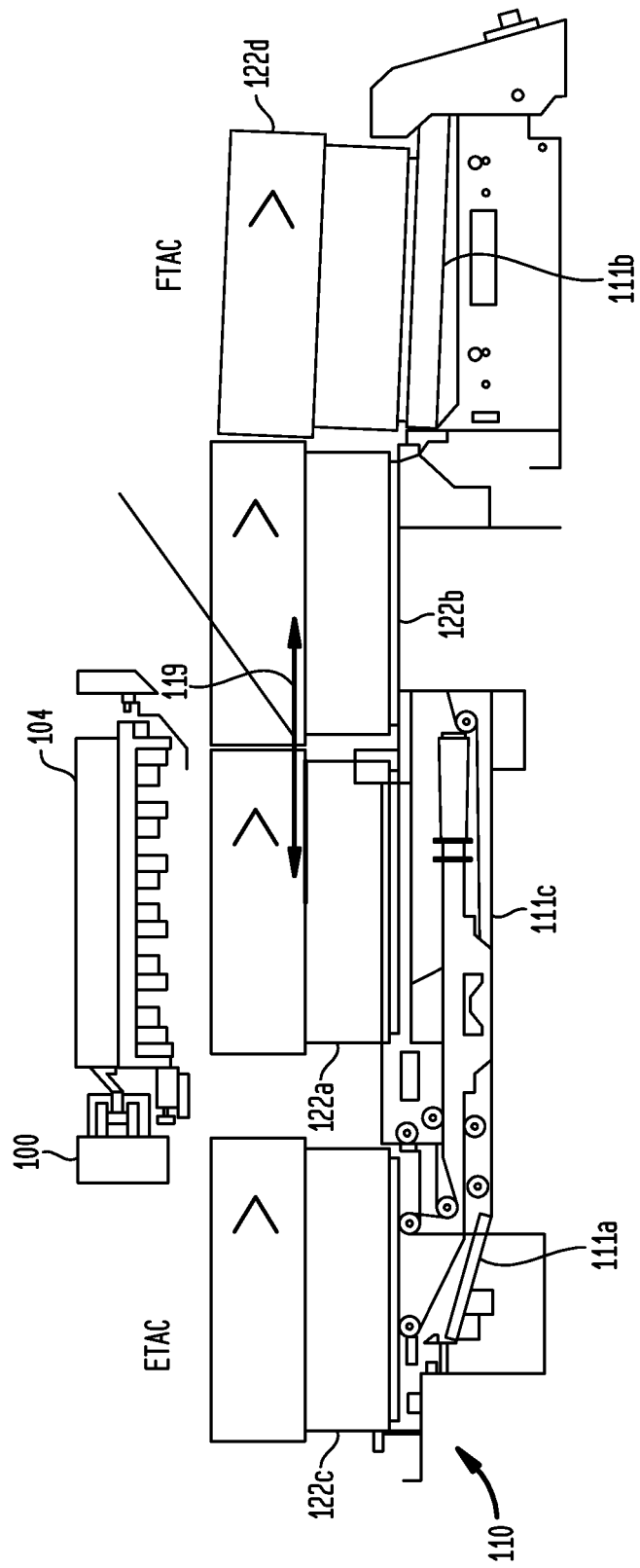
FIG. 2 shows a more detailed view of the interaction of the XPATD and an output of mail sorter in accordance with disclosed embodiments.
Figure 3:
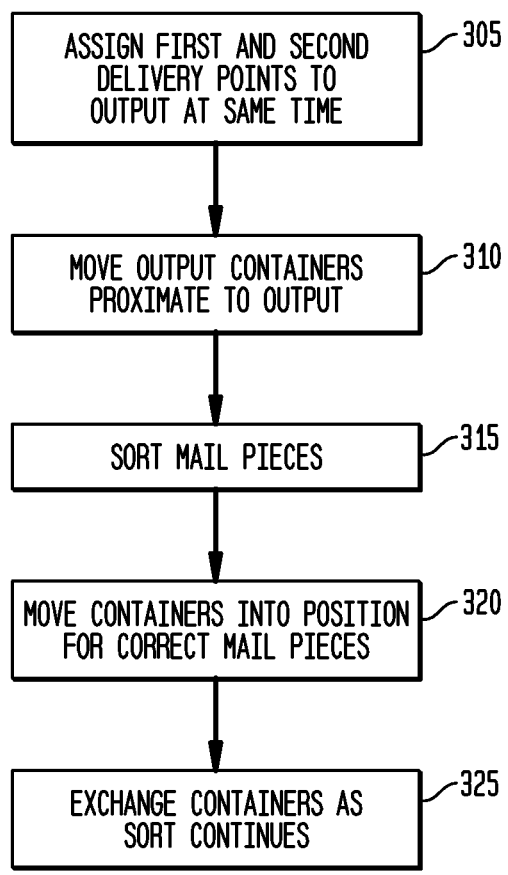
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The USPS has deployed hundreds of flats sorting machines that are carousel-type sorters dropping into single stationary trays under each output bin. The machines currently fit into tight floor space environments that prevent any expansion of the system. A planned consolidation of processing centers will make this problem even worse. Meanwhile, the mail volumes have changed from many flat articles per mailbox to just a few, so that a similar mail volume now tends to be distributed across many more delivery points.

In this new environment, it is highly desirable that the sorting machines be able to sort to more delivery points than currently possible. A typical approach would be to add output bins by lengthening the carousel to make this possible, but limited floor space prevents this.

Disclosed embodiments address these issues while adding very little or no floor space requirements. Disclosed embodiments increase the number of serviceable delivery points by up to four times the original number in a two-pass sortation scheme.

While the specific exemplary embodiments discussed below related to flats and flat sorters, the techniques disclosed herein can be applied to any mail piece, including letters, flats, parcels, or others, that can be transported to be placed in an output container as described herein, and these may all be generically referred to as "mail pieces". The "output container" may be referred to as a bin, tray, or otherwise, and can be implemented using any container that can be manipulated as described below and can receive the output mail pieces.

The term "mail" and "mail piece" is not limited to those mail pieces processed or delivered by a governmental postal service, but refer also to mail piece processed by private processors, sorters, and couriers.

Disclosed embodiments include methods and apparatuses for increasing the number of output bins in a mail processing machine, including a carousel-type mail sorting system that includes a multi-position apparatus that can exchange multiple output containers at an output of the mail processing machine. For example, a carousel-type sorter can include a moving carousel and a two-position tray-placement device at each of the stationary outputs. The placement device moves the appropriate of two mail trays to the receiving position under the drop point of the output bin. The effect of an increased number of output bins is that the machine can now sort mail to a much larger number of delivery points (destination mail boxes).

Disclosed embodiments can also employ more than two mail containers under each "drop point" output. The system moves each mail container associated with each output into place at the correct time to receive the appropriate output. In other embodiments, a single mail "container" can include multiple separate partitions, and in the description herein, references to moving separate output containers to receive the output is intended to include moving separate partitions of a single output container to receive that output.

This invention is applicable to any mail processing machine or carousel-type mail sorter, but for illustration purposes, the description below may refer to the Flats Sequencing System (FSS) Phase 1 flats sorting machine (the "FSS-1") manufactured by Northrop Grumman and Solystic. The FSS-1 has 360 outputs that drop mail into stationary trays, where one tray is located beneath each output bin.

These trays are moved into and out of drop position by a device called the "Place and Transfer Device" (PATD). The PATD moves the trays orthogonally to the direction of motion on the carousel. The purpose of the motion is to bring in empty trays and move out full ones.

Disclosed embodiments expand the function of the PATD to shift two trays under the output bin drop point to effectively double the number of output bins. An expanded-function PATD in accordance with disclosed embodiments may be referred herein to as an XPATD.

In a conventional mail sorter, including the FFS-1, a single destination point is assigned to a single output container at each output of the FSS-1 at any given time. For example, a sorter output is assigned to delivery point A, and all flats addressed to delivery point A are "dropped" from that output into a single container that is designated to receive all flats for delivery point A.

In accordance with disclosed embodiments, multiple destination points are assigned to multiple output containers at each output of the FSS-1 at the same time. In a two-container example, a sorter output is assigned to both delivery point A and delivery point B at the same time. All flats addressed to delivery point A or delivery point B are dropped from that output into either a first container, designated for delivery point A, or a second container, designated for delivery point B. As each mail piece is to be dropped at that output, the system moves the correct container—the first container or the second container—into place beneath the output. In this way, a single sorter output can service multiple delivery points and deliver mail pieces into the proper container for each delivery point assigned to the same output.

FIG. 1 shows a simplified illustration of a mail processing system in accordance with disclosed embodiments, in a top-down view. Sorting machine 100 can be any mail processing or sorting machine, and in specific embodiments, represents a carousel-type mail sorting system. In this example, mail pieces 102 travel through or along the sorting machine 100, as indicated by the directional arrow, and are sorted by being output via respective outputs 104. Each output represents more than one delivery point at the same time (although of course there may be other, standard outputs that can only service a single delivery point). The sorting machine 100 assigns each output 104 multiple delivery points, then "drops" each mail piece 102 from the output assigned to the delivery point corresponding to the destination address on the respective mail piece. Note that, in various embodiments, the conveyor system is a "single-file" conveyor.

Conveyor system 110 moves output containers 112 to their assigned locations. Conveyor system 110 can be implemented as one or more conveyors, for example, and can be considered a part of mail processing machine 100 or as a discrete unit. In this example, conveyor system 110 includes an Empty Tray Accumulating Conveyor (ETAC) 111a (generically referred to as an "empty-tray conveyor"), a Full Tray Accumulating Conveyor (FTAC) 111b (generically referred to as a "filled-tray conveyor"), and multiple XPATDs 111c in accordance with disclosed embodiments (generically referred to as "transverse conveyors").

In this example, arrow 114 indicates the direction in which the empty output containers 112 move along conveyor system 110 on empty-tray conveyor 111a until they are adjacent to their assigned outputs 104. Arrows 116 illustrate how output containers 112 are placed into position at their assigned output 104 by transverse conveyors 111c, and arrows 118 indicate how filled output containers 112 are later removed by transverse conveyors 111c to filled-tray conveyor 111b to transport their contained mail items 102 to the next processing stage. Note that, in various embodiments, there is only a single output "drop" at each transverse conveyor 111c, which can output to multiple containers using the techniques described herein. Output container 112 illustrated in this figure can correspond to output container 122c shown in FIG. 2, below.

In this embodiment, the empty-tray conveyor 111a is on the opposite side of the machine output from the filled-tray conveyor 111b, and the back-and-forth motion of the multiple output containers on transverse conveyors 111c is in a direction orthogonal to both the empty-tray conveyor and the filled-tray conveyor.

Output containers 122a and 122b illustrate output containers placed in position at an output 104. Note that output containers 122a and 122b are shown in this figure for illustrative purposes, even though in most implementations these containers are below the sorting machine 110 and so are not visible from a top-down view. Arrows 119 illustrate how output containers 122a and 122b are moved back-and-forth to be placed beneath output 104 according to the mail piece being output.

In this example, output container 122a is a first output container assigned to a first delivery point for an output 104, and output container 122b is a second output container assigned to a second delivery point for an output 104. When a mail piece 102 is sorted to the first delivery point, conveyor system 110 moves the first output container under the output 104 to receive the mail piece 102. Similarly, when a mail piece 102 is sorted to the second delivery point, conveyor system 110 moves the second output container under the output 104 to receive the mail piece 102.

The mail sorter 100, including conveyor system 110, can be controlled by a operation monitoring and control processor 130, which can be implemented using any controller configured to perform processes as described herein, and which can access a sortplan database 132.

FIG. 2 shows a more detailed view of the interaction of the conveyor system 110 and an output 104 of mail sorter 100 in accordance with disclosed embodiments. Shown here is a single output 104. Arrow 119 illustrates how output containers 122a and 122b are moved back-and-forth by XPATD transverse conveyor 111c to be placed beneath output 104 according to the mail piece being output. Empty output container 122c travels along the empty-tray conveyor 111a and filled container 122d travels along the filled-tray conveyor 111b. Empty output trays are loaded onto transverse conveyor 111c from the empty-tray conveyor 111a, and after the sort pass, are sent to the filled-tray conveyor 111b.

Output 104 of the mail sorter is assigned two different delivery points at the same time, one assigned to output container 122a and the other assigned to output tray 122b. Conveyor system 110 moves output containers 122a and 122b back and forth on transverse conveyor 111c so that the proper output container is beneath output 104 at the appropriate time to receive each mail piece for the corresponding assigned delivery point. This function, in this example, is performed by XPATD/transverse conveyor 111c.

Various embodiments can also handle exception processes, for example if output container 122a becomes full before output container 122b and needs to be replaced. Output container 122b can be temporarily ejected to the full tray output conveyor, then moved upstream just enough to provide clearance for full output container 122a to exit. Then output container 122b can be brought back into the XPATD to continue service. Meanwhile, an empty output container can be brought into the XPATD to replace output container 122a. Exchange of trays between the various conveyor portions can be implemented in a variety of ways known to those of skill in the art.

Note that, in some embodiments, an XPATD as disclosed herein can be integrated into an existing mail processing machine which is properly configured to perform the processes as described herein to produce a sorter with an expanded number of delivery points. In such a "retrofit" embodiment, not every PATD conveyor need be replaced with an XPATD conveyor. For example, in some cases, an existing machine can have an XPATD at every other station. This provides a "parking space" next to the standard outputs for empty trays that are staged to replace full trays where needed. In other embodiments, and in completely new machines, the sorter can be configured with ample space in this direction, eliminating possible traffics and providing an XPATD at every output.

FIG. 3 is a flowchart of a process in accordance with disclosed embodiments. In this example, the "system" refers to a mail processing machine, for example including a mail sorter and conveyor system configured to operate as described.

The system assigns a first delivery point and a second delivery point to a single output at the same time (step 305). Of course, in other embodiments, there could also be three or more assigned delivery points with associated output containers. The steps below are typically performed for a large number of outputs at the same time.

The system places both a first output container, associated with the first delivery point, and a second output container, associated with the second delivery point, into a position proximate to the output (step 310). Typically, the output containers are below the output such that each of the output containers can be moved beneath the output to receive sorted mail pieces.

The system sorts a plurality of mail pieces (step 315), including at least a first mail piece sorted to the first delivery point and at least a second mail piece sorted to the second delivery point.

As the mail pieces are being sorted, when the first mail piece reaches the output, the system moves the first output container into a position to receive the first mail piece from the output, and when the second mail piece reaches the output, the system moves the second output container into a position to receive the second mail piece from the output (step 320). Of course, this does not have to occur precisely "when" the mail piece reaches the output, and this language is intended to include moving the output container whenever the system identifies which of the delivery points will receive the next mail piece, and can include leaving the output containers in place if they are already in the proper position to receive the correct mail piece. Note that, as described, only one of the first and second output containers can be positioned to receive the mail pieces from the output at a time.

The system continues to move the first output container into a position to receive the mail pieces sorted to the first delivery point from the output and to move the second output container into a position to receive the mail pieces sorted to the second delivery point from the output (step 325). This can be a back-and-forth motion of the first and second output containers to exchange the containers beneath the output at the correct time. Of course, if an output container becomes full during a sort, it can be exchanged for an empty container as described herein, and the empty output container is associated with the proper delivery point.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. For example, various embodiments include systems, methods, and computer-readable media.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise. Similarly, various elements of the systems and apparatuses described herein can be duplicated, rearranged, or omitted in various embodiments, unless described or claimed otherwise.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a mail processing machine, the method comprising:
assigning a first delivery point and a second delivery point to a single output at the same time;
sorting a plurality of mail pieces, including at least a first mail piece sorted to the first delivery point and at least a second mail piece sorted to the second delivery point;
placing both a first output container, associated with the first delivery point, and a second output container, associated with the second delivery point, into a position proximate to the output;
while sorting, when the first mail piece reaches the output, moving the first output container into a first position to receive the first mail piece from the output, and when the second mail piece reaches the output, moving the second output container into a second position in place of the first output container, wherein the second position is substantially the same as the first position, to receive the second mail piece from the output; and
continuing to exchange the first output container and the second output container at the output, by moving the first output container into the first position in place of the second output container to receive the mail pieces sorted to the first delivery point from the output and moving the second output container into the second position to receive the mail pieces sorted to the second delivery point from the output.

2. The method of claim 1, wherein mail processing machine exchanges the position of the first output container and the second output container so that additional mail pieces sorted to the first and second delivery points are each output to the associated container.

3. The method of claim 1, wherein the mail processing machine includes a flats sorter.

4. The method of claim 1, wherein the mail processing system includes an expanded-function place and transfer device.

5. The method of claim 1, wherein the first and second output containers are placed in the position proximate to the output from an empty-tray conveyor.

6. The method of claim 1, wherein, when a sort pass is complete, the first and second output containers are removed from proximate to the output to a filled-tray conveyor.

7. The method of claim 1, wherein the first and second output containers are moved back-and-forth beneath the output by a transverse conveyor.

8. The method of claim 1, wherein the mail processing machine also moves a third output container into a position to receive the mail pieces sorted to a third delivery point from the output.

9. The method of claim 1, wherein the mail processing machine includes a plurality of outputs each assigned multiple delivery points at the same time.

10. The method of claim 1, wherein the first and second output containers are separate partitions of a single physical container.

11. An apparatus, comprising:
a mail sorter having a plurality of outputs; and
a conveyor system configured to move output containers into position to receive sorted mail pieces,
wherein the apparatus is configured to
assign, by a controller, a first delivery point and a second delivery point to a single output at the same time;
sort a plurality of mail pieces, under control of the controller, including at least a first mail piece sorted to the first delivery point and at least a second mail piece sorted to the second delivery point;
place, under control of the controller, both a first output container, associated with the first delivery point, and a second output container, associated with the second delivery point, into a position proximate to the output;
while sorting, when the first mail piece reaches the output, move the first output container into a first position to receive the first mail piece from the output, and when the second mail piece reaches the output, move the second output container into a second position in place of the first output container, wherein the second position is substantially the same as the first position, to receive the second mail piece from the output; and
continue to exchange the first output container and the second output container at the output under control of the controller, by moving the first output container into the first position in place of the second output container to receive the mail pieces sorted to the first delivery point from the output and moving the second output container into the second position to receive the mail pieces sorted to the second delivery point from the output.

12. The apparatus of claim 11, wherein apparatus exchanges the position of the first output container and the second output container so that additional mail pieces sorted to the first and second delivery points are each output to the associated container.

13. The apparatus of claim 11, wherein the mail sorter is a flats sorter.

14. The apparatus of claim 11, wherein the conveyor system is an expanded-function place and transfer device.

15. The apparatus of claim 11, wherein the first and second output containers are placed in the position proximate to the output from an empty-tray conveyor.

16. The apparatus of claim 11, wherein, when a sort pass is complete, the first and second output containers are removed from proximate to the output to a filled-tray conveyor.

17. The apparatus of claim 11, wherein the first and second output containers are moved back-and-forth beneath the output by a transverse conveyor.

18. The apparatus of claim 11, wherein the apparatus also moves a third output container into a position to receive the mail pieces sorted to a third delivery point from the output.

19. The apparatus of claim 11, wherein the plurality of outputs are each assigned multiple delivery points at the same time.

20. The apparatus of claim 11, wherein the first and second output containers are separate partitions of a single physical container.

* * * * *